(12) United States Patent
Berry et al.

(10) Patent No.: US 9,649,899 B1
(45) Date of Patent: May 16, 2017

(54) TRAILER HITCH ALIGNMENT GUIDE

(71) Applicants: Albert Berry, Avon Park, FL (US);
Kenneth Williams, Avon Park, FL (US)

(72) Inventors: Albert Berry, Avon Park, FL (US);
Kenneth Williams, Avon Park, FL (US)

(*) Notice: Subject to any disclaimer, the term of this patent is extended or adjusted under 35 U.S.C. 154(b) by 0 days.

(21) Appl. No.: 15/044,305

(22) Filed: Feb. 16, 2016

(51) Int. Cl.
*B60D 1/36* (2006.01)

(52) U.S. Cl.
CPC ..................... *B60D 1/36* (2013.01)

(58) Field of Classification Search
CPC .................... B60D 1/36; B60D 1/40
See application file for complete search history.

(56) References Cited

U.S. PATENT DOCUMENTS

| | | | |
|---|---|---|---|
| 4,988,116 A * | 1/1991 | Evertsen | B60D 1/363 280/477 |
| 5,108,123 A * | 4/1992 | Rubenzik | B60D 1/36 280/477 |
| 5,159,312 A * | 10/1992 | Engle | B60D 1/60 307/9.1 |
| 5,269,554 A | 12/1993 | Law | |
| 5,558,352 A | 9/1996 | Mills | |
| 5,729,194 A * | 3/1998 | Spears | B60D 1/06 280/477 |
| 5,861,814 A * | 1/1999 | Clayton | B60D 1/36 280/504 |
| 6,100,795 A | 8/2000 | Otterbacher | |
| 6,273,448 B1 | 8/2001 | Cross | |
| D458,877 S | 6/2002 | Ross | |
| 6,585,281 B1 | 7/2003 | Voorting | |
| 7,036,840 B2 | 5/2006 | Kwilinski | |
| 7,891,691 B2 | 2/2011 | Bearey | |
| 2006/0220345 A1 | 10/2006 | Schmidt | |
| 2011/0216199 A1* | 9/2011 | Trevino | B60D 1/36 348/148 |

FOREIGN PATENT DOCUMENTS

CA 2692277 A1 1/2009

* cited by examiner

*Primary Examiner* — Kevin Hurley
(74) *Attorney, Agent, or Firm* — Kyle A. Fletcher, Esq.

(57) ABSTRACT

The above shortcomings of existing trailer hitches are addressed in this disclosure. The trailer hitch alignment guide is a device that: 1) provides visible feedback to drivers of vehicles regarding the relative position of the vehicle and the trailer; and 2) provides a visual and audible signal when the vehicle is in the proper position relative to the trailer. The trailer hitch alignment guide comprises a guide and a target.

17 Claims, 8 Drawing Sheets

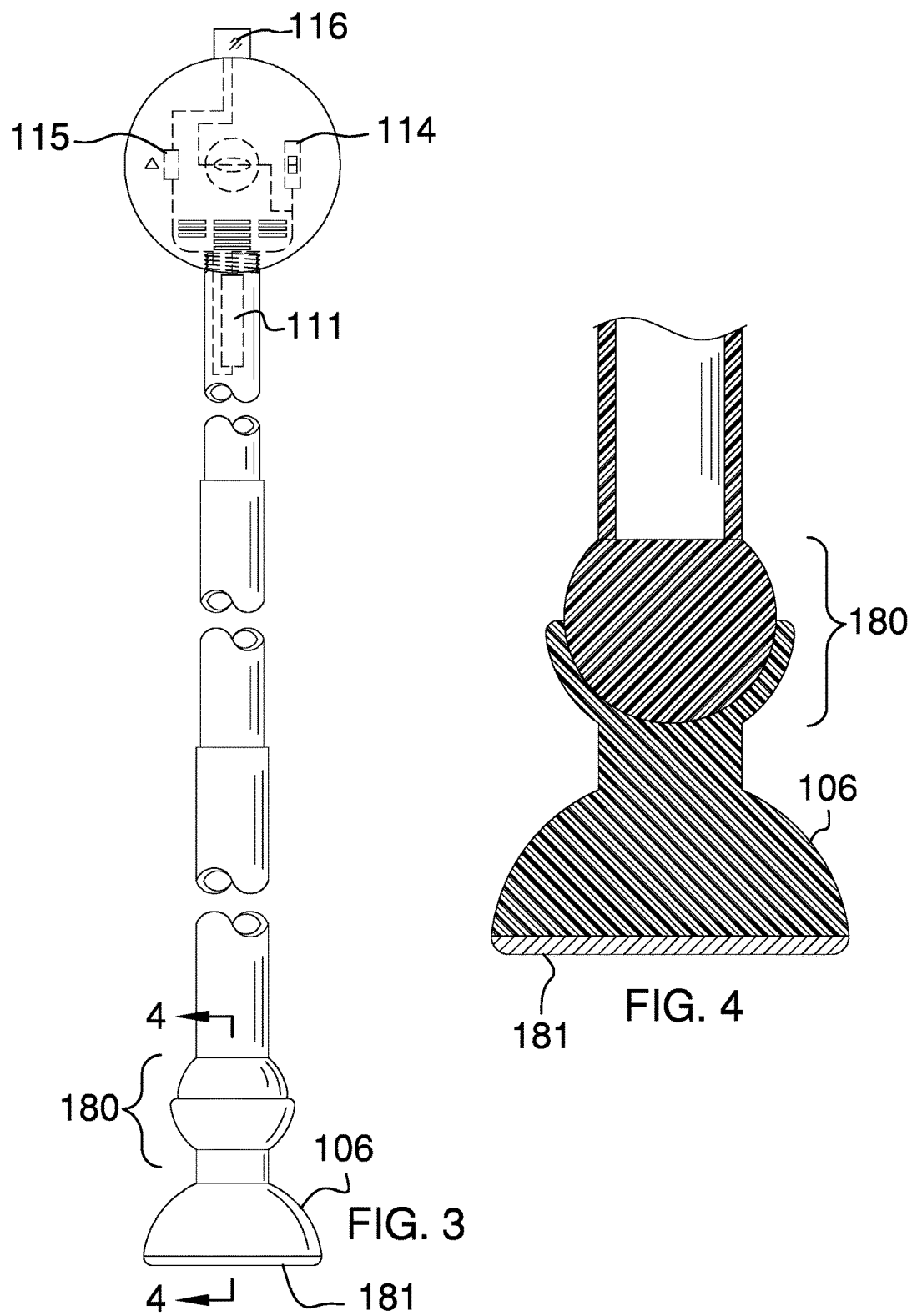

TRAILER HITCH ALIGNMENT GUIDE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of facilitating the connection of trailers, more specifically, an accessory configured for use in hooking up trailers to vehicles.

Attaching a trailer to a vehicle requires backing the vehicle towards the trailer in a manner that aligns the vehicle and trailer for coupling. This can be difficult for drivers inexperienced with using trailers and is, unfortunately, a common problem across all types of trailer hitches.

The most common solutions strategies to solve this problem involve: 1) a strategy of trial and error wherein a driver gets in and out of the vehicle to see where the vehicle is relative to where the vehicle needs to be; or, 2) a two person strategy wherein a second person, who is able to see the trailer hitch, directs the driver to perform the maneuvers required to get the vehicle into position.

SUMMARY OF INVENTION

The above shortcomings of existing trailer hitches are addressed in this disclosure. The trailer hitch alignment guide is a device that: 1) provides visible feedback to drivers of vehicles regarding the relative position of the vehicle and the trailer; and 2) provides a visual and audible signal when the vehicle is in the proper position relative to the trailer.

These together with additional objects, features and advantages of the trailer hitch alignment guide will be readily apparent to those of ordinary skill in the art upon reading the following detailed description of the presently preferred, but nonetheless illustrative, embodiments when taken in conjunction with the accompanying drawings.

In this respect, before explaining the current embodiments of the trailer hitch alignment guide in detail, it is to be understood that the trailer hitch alignment guide is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trailer hitch alignment guide.

It is therefore important that the claims be regarded as including such equivalent construction insofar as they do not depart from the spirit and scope of the trailer hitch alignment guide. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a front view of an embodiment of the disclosure.

FIG. 4 is a detail view of an embodiment of the disclosure.

DETAILED DESCRIPTION OF THE EMBODIMENT

Figure 1:
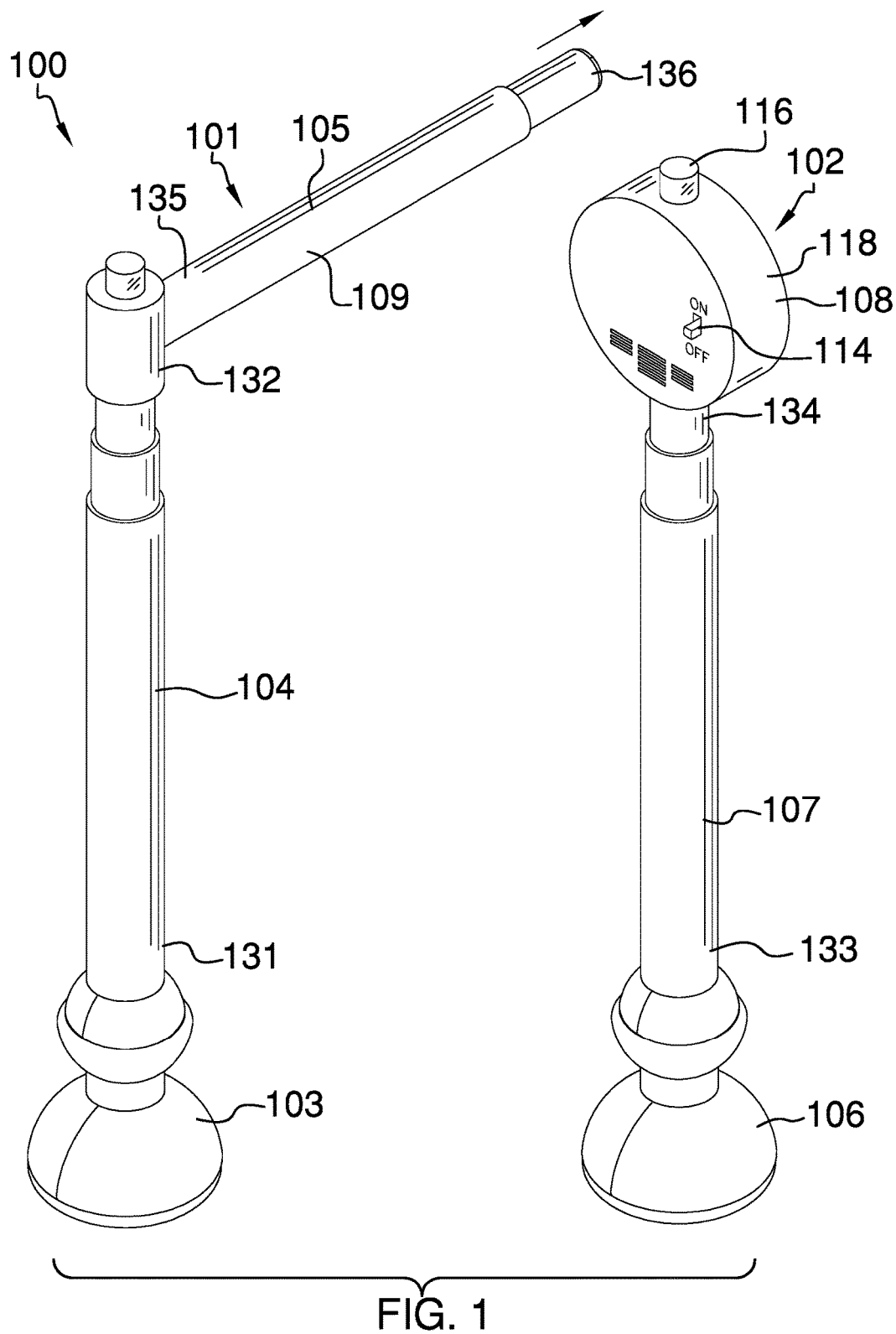
FIG. 1 is a perspective view of an embodiment of the disclosure.
Figure 2:
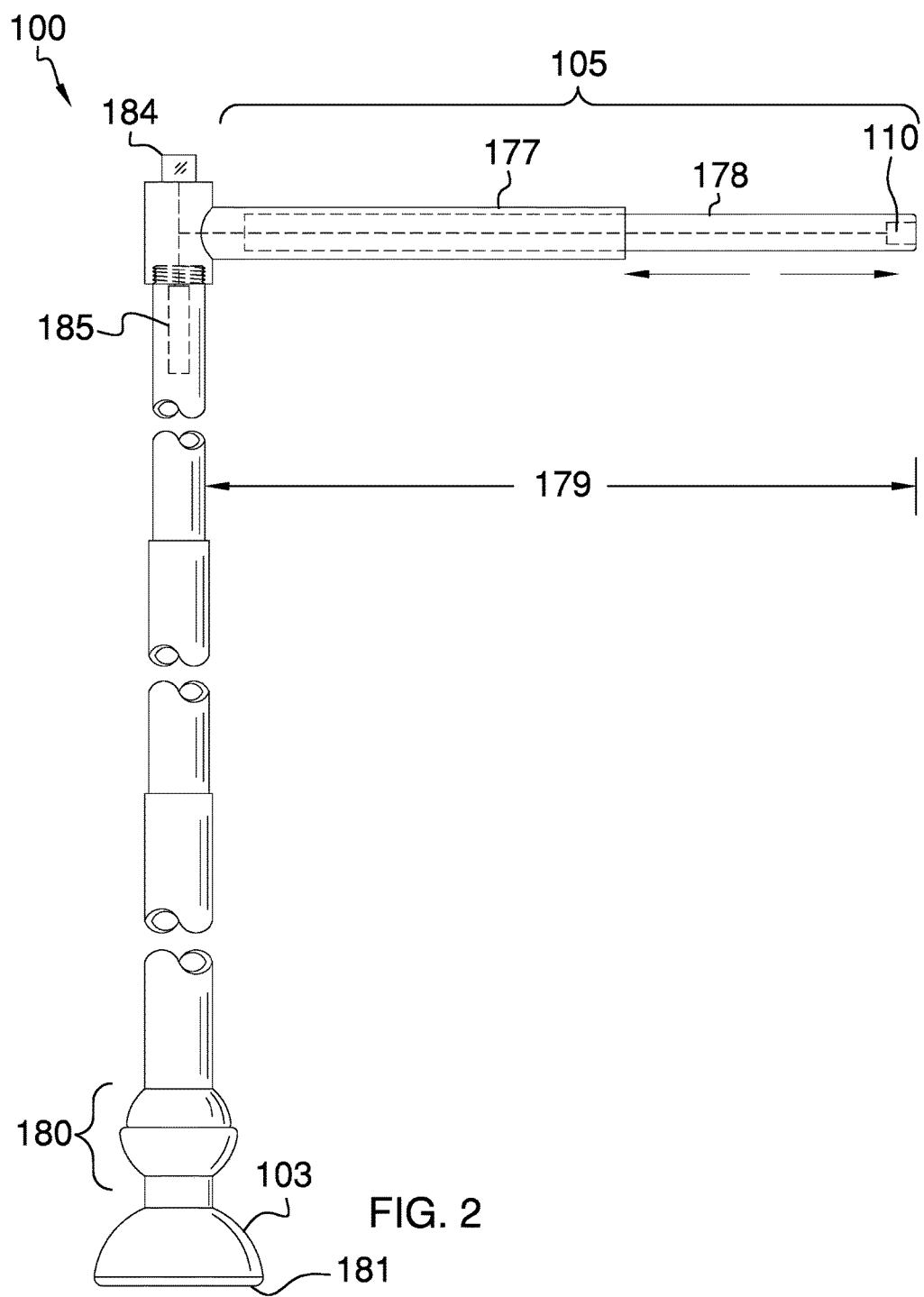
FIG. 2 is a side view of an embodiment of the disclosure.
Figure 5:
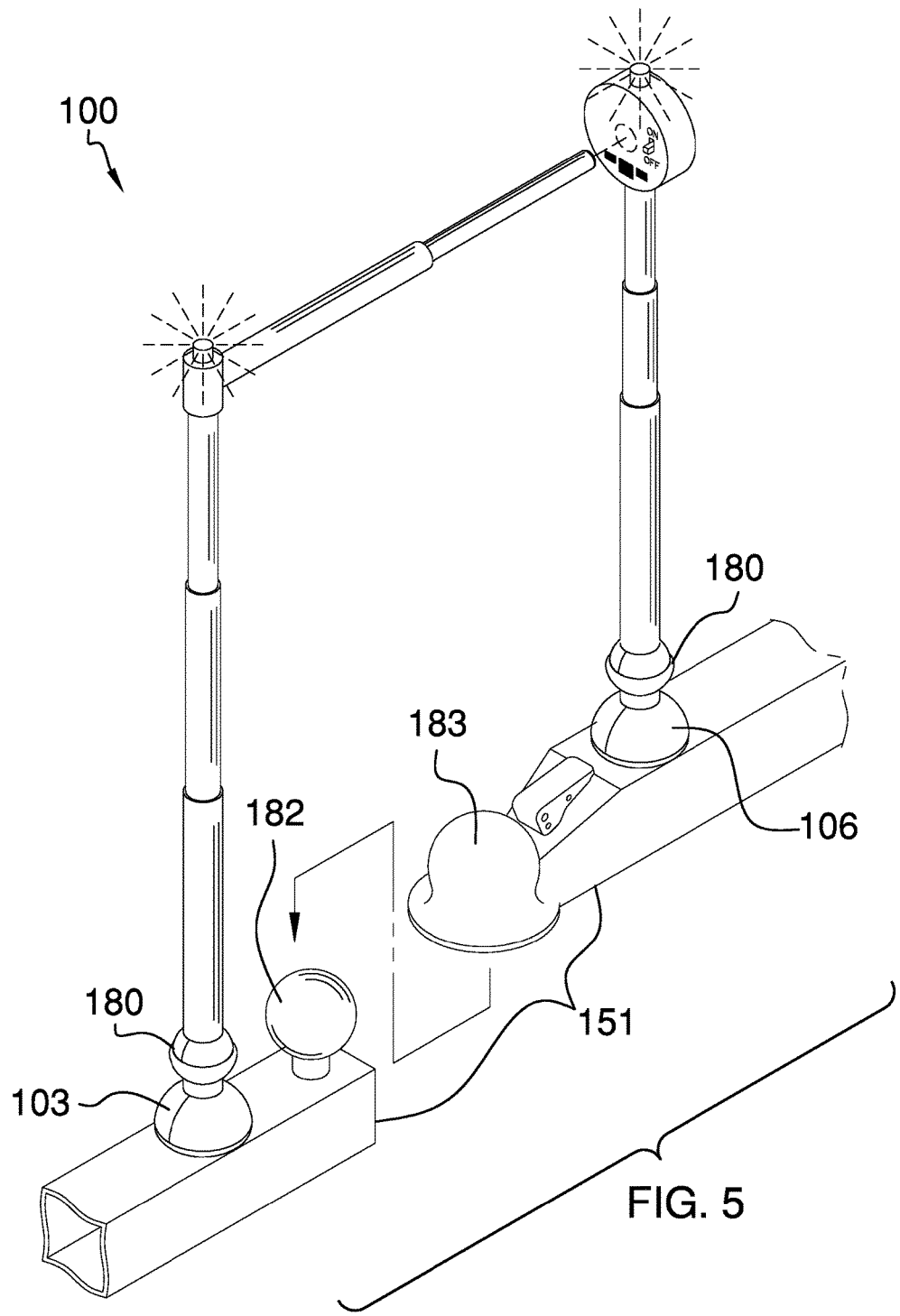
FIG. 5 is an in use view of an embodiment of the disclosure.
Figure 6:
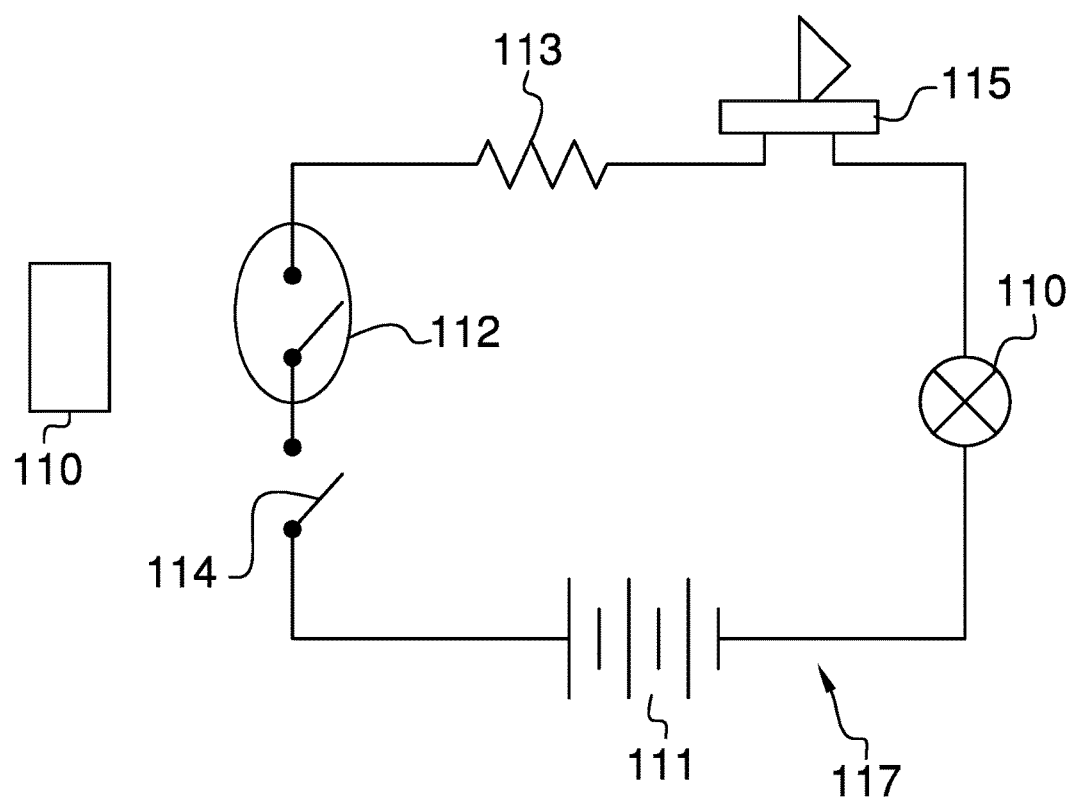
FIG. 6 is a schematic view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 9. The trailer hitch alignment guide 100 (hereinafter invention) comprises a guide 101 and a target 102.

The method of operation of the invention 100 is a follows. The guide 101, which is mounted on the vehicle 152, is fitted with a proximity magnet 110. The proximity magnet 110 is used to signal the position of the guide 101, and by inference, the position of the vehicle 152. The target 102, which can be mounted on the trailer 153 or at a position near the trailer 153, if fitted with a magnetic switch 112. When the vehicle 152 is moved into a position where the proximity magnet 110 is near the magnetic switch 112, the magnetic switch 112 closes activating an electrical circuit 117. Once the magnetic switch closes a lamp 116 and a horn 115 are activated signaling the vehicle 152 driver 154 that the vehicle 152 is in position.

The guide 101 further comprises a first magnetic base 103, a first telescopic pole 104, and a boom 105. The first telescopic pole 104 is further defined with a first end 131 and second end 132. The first end 131 of the first telescopic pole 104 is attached to the first magnetic base 103. The first magnetic base 103 is a magnetic antenna mount that can be attached to the bumper or body of the vehicle 152 magnetically. The second end 132 of the first telescopic pole 104 is attached to the boom 105.

The boom 105 further comprises a third telescopic pole 109 and the proximity magnet 110. The third telescopic pole 109 is further defined with a fifth end 135 and a sixth end 136. The fifth end 135 of the third telescopic pole 109 is attached to the second end 132 of the first telescopic pole 104 using commercially available hardware. The proximity magnet 110 is attached to the sixth end 136 of the third telescopic pole 109. Depending on the type of telescopic pole used, the proximity magnet 110 can be mounted inside the sixth end 136 of the third telescopic pole 109 or, using commercially available hardware, the proximity magnet 110 can be mounted on the exterior of the sixth end 136 of the third telescopic pole 109. The proximity magnet 110 is a commercially available permanent magnet.

It shall be noted that the boom 105 may be telescopic, and further defined with a first boom member 177 from which a second boom member 178 telescopes. The second boom member 178 enables a boom length 179 to adjust as needed. The sixth end 136 of the boom 105 is located on the second boom member 178.

The third telescopic pole 109 is positioned so that it projects perpendicularly away from the first telescopic pole 104. The first telescopic pole 104 is selected so that the third telescopic pole 109 can rotate at least 270 degrees around the center axis of the first telescopic pole 104.

The purpose of using the first telescopic pole 104 is to allow the height of the boom 105 to be adjusted so that it can match the height of the disk 108 of the target 102. The purpose for using the third telescopic pole 109 and for allowing the third telescopic pole 109 to rotate around the center axis of the first telescopic pole 104 is to allow for adjustment of the position of the proximity magnet 110 relative to the position of the vehicle 152.

The target 102 further comprises a second magnetic base 106, a second telescopic pole 107, and a disk 108. The second telescopic pole 107 is further defined with a third end 133 and fourth end 134. The third end 133 of the second telescopic pole is attached to the second magnetic base 106. The second magnetic base 106 is a magnetic antenna mount that can be attached to the bumper or body of the trailer 153 magnetically. The fourth end 134 of the second telescopic pole 107 is attached to the disk 108. The disk 108 further comprises a battery 111, a magnetic switch 112, a limit resistor 113, an on off switch 114, a horn 115, a lamp 116, and a housing 118. Collectively, the battery 111, the magnetic switch 112, the limit resistor 113, the on off switch 114, the horn 115, and the lamp 116 make up the electric circuit 117. The housing 118 is a structure that is designed to hold and contain the components of the electric circuit 117. The housing 118 is designed with holes to accommodate: 1) access to the on off switch 114; 2) the visible placement of the lamp 116; and 3) allow sound from the horn 115 to be clearly heard. The purpose of using the second telescopic pole 107 is to allow the height of the disk 108 to be adjusted so that it can match the height of the boom 105 of the guide 101 and so that the disk can be seen by the driver 154.

The operation of the electric circuit 117 is a follows: The electric circuit 117 is enabled by closing the on off switch 114. Once enabled the electric circuit 117 remains dormant until the proximity magnet 110 gets close enough to the magnetic switch 112 to close the magnetic switch 112. Once the magnetic switch 112 is closed, current flows from the battery 111, through the on off switch 114, the magnetic switch 112, and the limiting resistor 113 to power the horn 115 and the lamp 116 which provides a visual and audible signal to the driver 154 of the vehicle 152. The purpose of the limit resistor 113 is to limit the current flowing through the electrical circuit 117.

Figure 8:
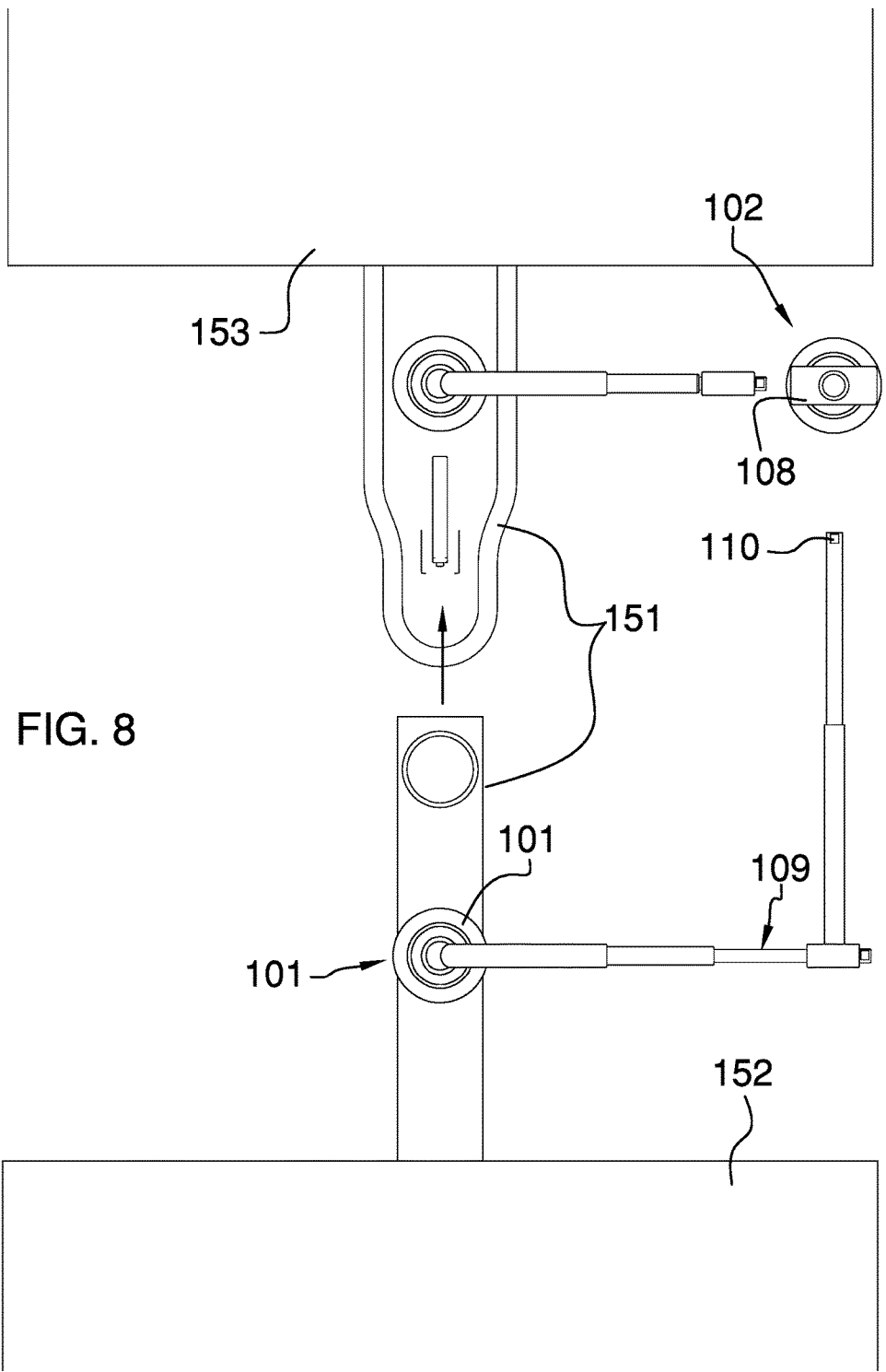
FIG. 8 is an in use view of an embodiment of the disclosure.

Both the first telescopic pole 104 and the second telescopic pole 107 are defined with a ball joint 180. The ball joint 180 is provided at the first end 131 of the first telescopic pole 104 as well as the third end 133 of the second telescopic pole 107. The ball joint 180 of the first telescopic pole 104 and the second telescopic pole 107 enable manipulation of the locale with which the guide 102 and the target 101. Referring to FIG. 8, the 105 and the proximity magnet 110 of the boom 105 and the target 102 may be aside of the hitch 151.

It shall also be noted that a magnet member 181 is positioned under the first magnetic base 103 and the second magnetic base 106. The magnet member 181 is responsible for securing the invention 100 onto the hitch 151. It shall be further noted that the first magnetic base 103 is adapted to be positioned forward of a hitch ball 182; whereas the second magnetic base 106 is adapted to be positioned rear of a hitch tongue 183.

The second end 132 of the first telescopic pole 104 has a light 184 that acts as a beacon when the boom 105 contacts the target 102 via the proximity magnet 110. The light 184 is powered via a second battery 185 provided inside of the second end 132 of the first telescopic pole 104.

Figure 7:
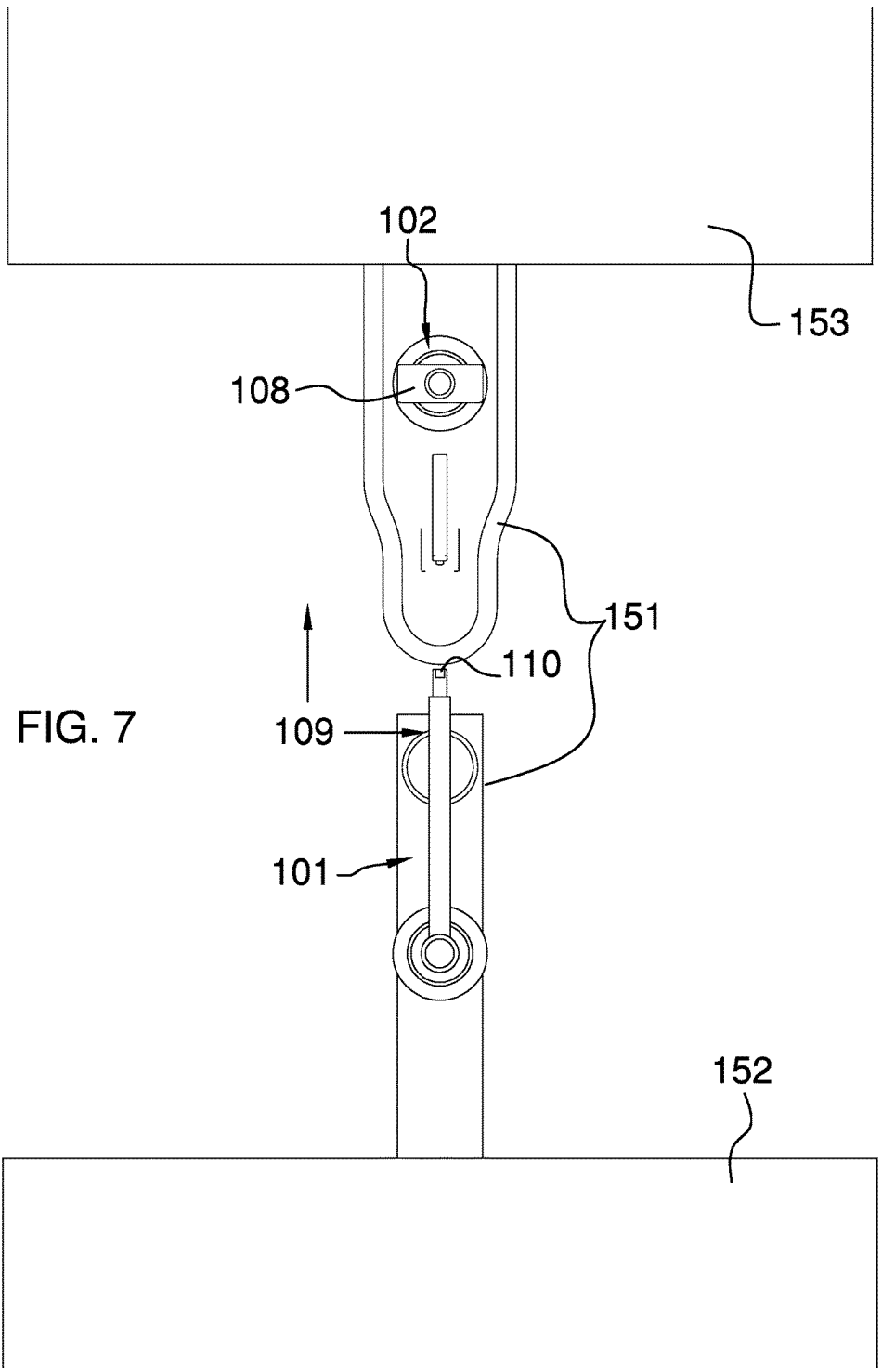
FIG. 7 is an in use view of an embodiment of the disclosure.
Figure 9:
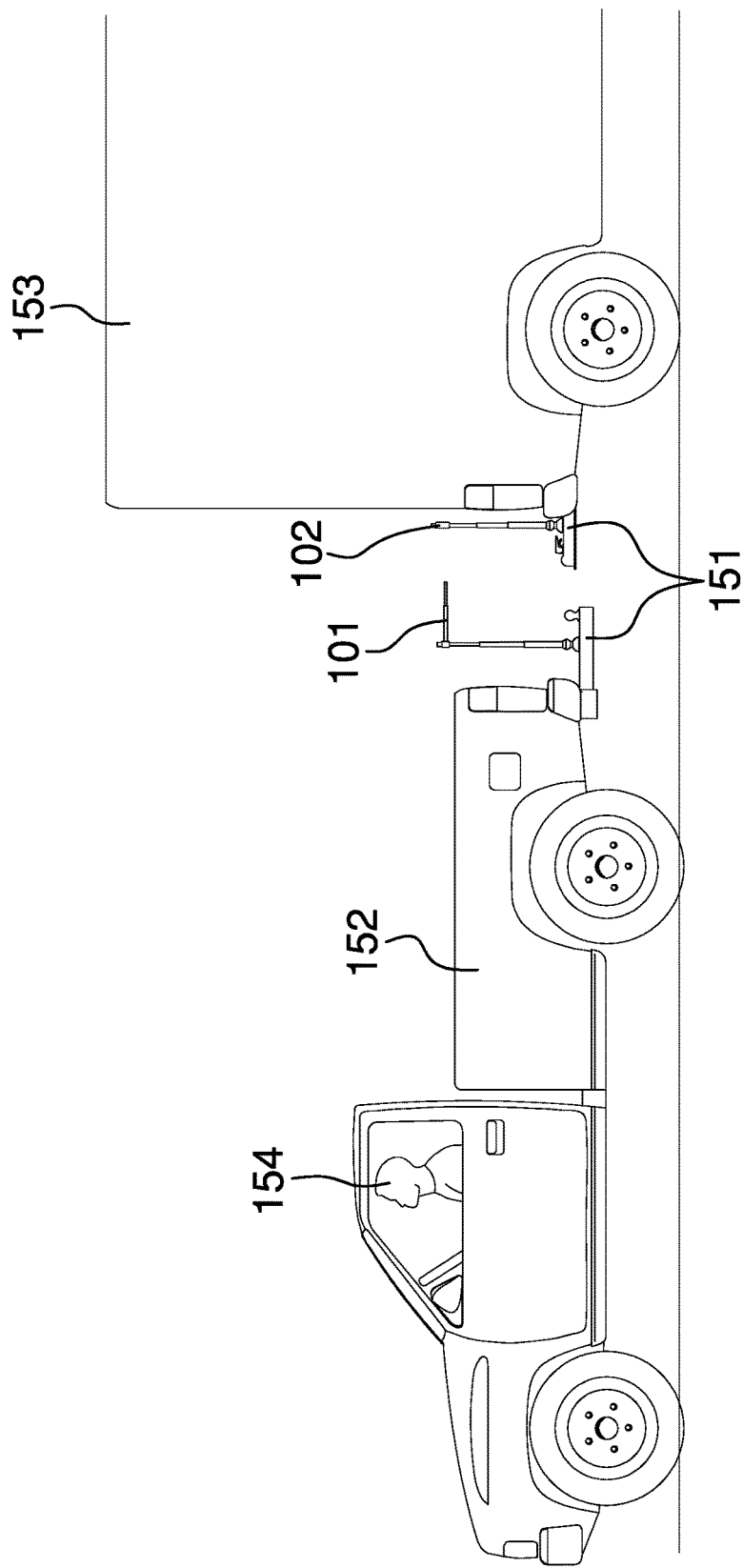
FIG. 9 is an in use view of an embodiment of the disclosure.

To use the invention 100, as shown in FIGS. 7 and 9, the second magnetic base 106 of the target 102 is placed on the trailer 153 near the hitch 151. The second telescopic pole 107 is raised so that the disk 108 can be seen by the driver 154 through the rear view mirror of the vehicle 152. The first magnetic base 103 of the guide 101 is placed on the vehicle 152 near the hitch 151. The first telescopic pole 104 is raised so that the boom 105 is at the same height off the ground as the disk 108. The on off switch 114 on the disk 108 is turned on (closed position). The driver 154 then backs the vehicle 152 towards the trailer 153 until the proximity magnet 110 closes the magnetic switch 112, which powers the lamp 116 and horn 115.

In an alternative way to use the invention 100, as shown in FIG. 8, the second magnetic base 106 can be placed on the ground near the trailer 153 so that the target 102 can be seen from the driver's side mirror 155. The second telescopic pole 107 is raised so that the disk 108 can be readily seen by the driver 154. The first magnetic base 103 of the guide 101 is placed on the vehicle 152 near the hitch 151. The first telescopic pole 104 is raised so that the boom 105 is at the same height off the ground as the disk 108. The third telescopic pole 109 is rotated and extended to extend the proximity magnet 110 beyond the vehicle 152 towards the target 102. The on off switch 114 on the disk 108 is turned on (closed position). The driver 154 then backs the vehicle 152 towards the trailer 153 until the proximity magnet 110 closes the magnetic switch 112, which powers the lamp 116 and horn 115.

Magnetic antenna mounts are readily and commercially available. Telescopic poles are readily and commercially available. Permanent magnets are readily and commercially available. Magnetic switches, lamps, horns, batteries, and resistors are readily and commercially available. Electrical circuits incorporating magnetic switches, lamps, horns, batteries, and resistors are well known and documented in the art. A normally open magnetic switch is preferred. The first telescopic pole 104, second telescopic pole 107, third telescopic pole 109, and housing 118 should be made of non-conducting and non-magnetic materials including, but not limited to, polyethylene or polyvinyl chloride. For cost control purposes, instead of using a magnetic switch 112 large enough to handle the current required to power the lamp 116 and the horn 115, the magnetic switch can be replaced with a smaller magnetic switch that provides a control signal to a logic circuit and associated relays that in turn transfers power to the lamp 116 and the horn 115. These sorts of logic circuits and associated relays are well known and documented in the art. The lamp 116 can be a light bulb or one or more light emitting diodes.

The following definitions were used in this disclosure:

Trailer: As used in this disclosure, a trailer refers to an unpowered means of conveyance or transport that can be attached to a vehicle.

Vehicle: As used in this disclosure, a vehicle refers to a self-powered means of conveyance or transport. Examples of vehicles include, but are not limited to, automobiles, motorcycles, and the tractor portion of a tractor-trailer.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A trailer hitch alignment device comprising:
   a guide and a target;
   wherein the guide generates a magnetic field;
   wherein the target detects the magnetic field;
   wherein once the target detects the magnetic field an electrical circuit is completed to activate a signal;
   wherein the signal further comprises a visual signal and an audible signal;
   wherein the magnetic field is generated by a permanent magnet;
   wherein the guide further comprises a first magnetic base, a first telescopic pole, and a boom.

2. The trailer hitch alignment device according to claim 1 wherein the first telescopic pole is further defined with a first end and second end;
   wherein the first end of the first telescopic pole is attached to the first magnetic base;
   wherein the second end of the first telescopic pole is attached to the boom.

3. The trailer hitch alignment device according to claim 2 wherein the boom further comprises a third telescopic pole and a proximity magnet.

4. The trailer hitch alignment device according to claim 3 wherein the proximity magnet is a permanent magnet.

5. The trailer hitch alignment device according to claim 4 wherein the third telescopic pole is further defined with a fifth end and a sixth end;
   wherein the fifth end of the third telescopic pole is attached to the second end of the first telescopic pole;
   wherein the proximity magnet is attached to the sixth end of the third telescopic pole.

6. The trailer hitch alignment device according to claim 5 wherein the third telescopic pole projects perpendicularly away from the first telescopic pole.

7. The trailer hitch alignment device according to claim 6 wherein the third telescopic pole can rotate at least 270 degrees around the first telescopic pole.

8. The trailer hitch alignment device according to claim 1 wherein the target further comprises a second magnetic base, a second telescopic pole, and a disk.

9. The trailer hitch alignment device according to claim 8 wherein the second telescopic pole is further defined with a third end and fourth end;
   wherein the third end of the second telescopic pole is attached to the second magnetic base;
   wherein the fourth end of the second telescopic pole is attached to the disk.

10. The trailer hitch alignment device according to claim 9 wherein the disk further comprises the electric circuit and a housing;
    wherein the electric circuit further comprises a battery, a magnetic switch, an on off switch, a horn, and a lamp.

11. The trailer hitch alignment device according to claim 10 wherein the housing is a structure that contains the electric circuit;
    wherein the housing has a first set of one or more holes to accommodate access to the on off switch;
    wherein the housing has a first set of one or more holes to accommodate the visible placement of the lamp;
    wherein the housing has a first set of one or more holes to accommodate the escape of sound from the horn.

12. The trailer hitch alignment device according to claim 11 wherein the boom is telescopic, and further defined with a first boom member from which a second boom member telescopes; wherein the second boom member enables a boom length to adjust as needed; wherein the sixth end of the boom is located on the second boom member.

13. The trailer hitch alignment device according to claim 12 wherein a magnet member is positioned under the first magnetic base and the second magnetic base.

14. The trailer hitch alignment device according to claim 13 wherein the first magnetic base is adapted to be positioned forward of a hitch ball; whereas the second magnetic base is adapted to be positioned rear of a hitch tongue.

15. The trailer hitch alignment device according to claim 14 wherein both the first telescopic pole and the second telescopic pole are defined with a ball joint.

16. The trailer hitch alignment device according to claim 15 wherein the ball joint is provided at the first end of the first telescopic pole as well as the third end of the second telescopic pole; wherein the ball joint of the first telescopic pole and the second telescopic pole enable manipulation of the locale with which the guide and the target; wherein the ball joint enables rotational movement of the first telescopic pole as well as the second telescopic pole.

17. The trailer hitch alignment device according to claim 16 wherein the second end of the first telescopic pole has a light that acts as a beacon when the boom contacts the target via the proximity magnet; wherein the light is powered via a second battery provided inside of the second end of the first telescopic pole.

* * * * *